Figure 1:
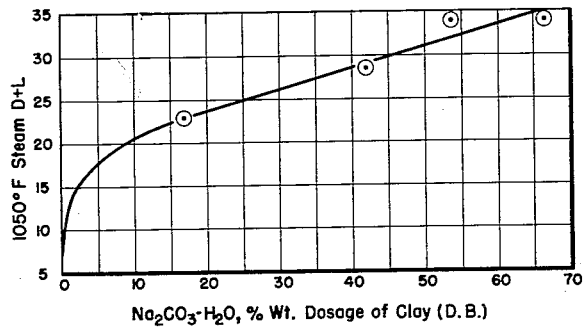

April 21, 1964    W. A. STOVER ETAL    3,130,170
PREPARATION OF CRACKING CATALYSTS FROM CLAY
Filed Aug. 7, 1961

EFFECT OF SODA ASH DOSAGE ON PROPERTIES OF CATALYST

EFFECT OF CALCINATION CONDITIONS AND SODA ASH DOSAGE ON PROPERTIES OF CATALYST

EFFECT OF ACID DOSAGE AND CALCINATION TEMPERATURE ON PROPERTIES OF CATALYST

W. A. STOVER
W. S. BRIGGS
INVENTORS

United States Patent Office 3,130,170
Patented Apr. 21, 1964

3,130,170
PREPARATION OF CRACKING CATALYSTS FROM CLAY
William Albert Stover, Ellicott City, and Warren S. Briggs, Silver Spring, Md., assignors to W. R. Grace & Co., New York, N.Y., a corporation of Connecticut
Filed Aug. 7, 1961, Ser. No. 129,586
6 Claims. (Cl. 252—450)

This invention relates to the preparation of a clay cracking catalyst with improved cracking performance by a novel process.

Activated clays have been used for petroleum cracking catalysts for about 25 years. During World War II, the demand for higher octane gasoline led to the development of synthetic catalysts. Since World War II and up to about five years ago, the synthetic manufacturers sold about 80–90% of the cracking catalysts used in the United States. Over the past five years, however, the petroleum industry has revived interest in catalysts made from clays. This change has come about through the improvement of cheaper clay cracking catalysts.

It has been known that a number of factors determine the ability of a catalyst to perform. Among these are the impurity content, the pore volume of the catalyst, the pore diameter, and the overall surface area, all of which are quantities measurable by physical means. However, it is only fairly recently that means have been established to reduce the impurity content and improve these catalytic properties.

One of the earliest, and still principally used methods of activating natural clays is to treat the clay with varying amounts of acid. When the clay, composed essentially of silica and alumina along with traces of other metallic compounds such as iron oxide, is exposed to acid, the acid serves to dissolve the alumina and other metallic compounds. It has been found that when the mixture of clay and acid solution is ammoniated, the alumina is reprecipitated on the surface of the silica, resulting in a suitable cracking catalyst. However, although the clay catalysts used to date are effective, there is still much room for improvement.

We have found that a superior clay catalyst can be prepared by treating the clay with a sodium salt to form a sodium aluminum silicate complex, gelling the silicate and releasing the aluminum by treating with a strong mineral acid, adding a basic precipitant to precipitate the aluminum salts, filtering, drying, treating the filtrate with a material capable of base exchange with the sodium, washing, drying calcining, and recovering the catalyst product.

The preferred procedure for carrying out the process of our invention is as follows: raw clay is mixed in an intensifier blender with sodium carbonate, $Na_2CO_3 \cdot H_2O$. The sodium carbonate can be present in from 35%–80% by weight of the dry clay, preferably in the range of 40%–50%. The mixture is mulled to an extrudable paste, calcined at a temperature of about 800° F. to 1400° F. for about 1.6 to 2 hours, preferably 1400° F. for about 1 hour, after which it is crushed, ground and slurried in water. Concentrated sulfuric acid (98% $H_2SO_4$) is added to give an acid concentration of about 3 to 15% weight $H_2SO_4$, preferably about 5%, and an acid dosage of from 45 to 130% weight, preferably about 70–100 weight percent. The mixture is heated to a temperature in the range of 180 to 210° F. for 1 to 2 hours, cooled below 100° F., and neutralized with ammonia. Ammonia should be added to bring the pH to 5.0 to 10.0, preferably to pH 8.5. The slurry is filtered to remove the major part of soluble salts prior to drying, reslurried in water and refiltered and dried at about 160–230° F. The dried filter cake is base exchanged with a suitable aqueous solution, preferably containing 3% by weight $(NH_4)_2SO_4$ and 1% by weight $NH_4OH$. The dried solids are base exchanged, washed, redried, and pilled.

Sulfuric acid was used in the development of these catalysts. Other strong mineral acids such as hydrochloric, nitric, etc. give comparable results. As an alternate route, the catalyst can be filtered immediately following the acid treatment, and the aluminum sulfate removed as a filtrate. The filter cake is then ammoniated, filtered, reslurried in dilute ammonia, dried, and treated as the above process.

The D+L activity test is used to determine the ability of catalysts to crack gas oil under fixed conditions. The D+L activity is expressed as the volume percent of 400° F. end point gasoline produced in the liquid product from the cracking reaction. The larger the D+L number, the better the activity. The gas and coke produced during the operation was also measured. These are expressed as the gas producing factor (GPF) and the carbon producing factor (CPF). The GPF and the CPF indicate the selectivity of the catalyst. Here, the smaller the GPF and the CPF numbers the better the selectivity.

In commercial operation, cracking catalysts are heated to high temperature during the air regeneration cycle. Thus, a procedure was developed by industry to check the relative thermal stability of commercial and experimental cracking catalysts. This procedure involves pretreating the catalysts at various temperatures prior to the D+L test. Here, pretreatment is carried out in air for a 3 hour period at 1250° F., 1550° F., 1650° F., 1700° F., and 1750° F.

In commercial operation, cracking catalyst are subjected to a high temperature steam purge between the cracking and air regeneration cycles. To simulate refinery conditions, a procedure was developed to check the relative steam stability of catalysts. In this procedure, the catalyst is subjected to 60 p.s.i.g. steam at 1050° F. for 24 hours. Commercial 13% $Al_2O_3$, 87% $SiO_2$ synthetic catalysts have a steam D+L of 30 to 31, and 25% $Al_2O_3$, 75% $SiO_2$ synthetic catalysts have a steam D+L of 35 to 36.

The D+L data presented in the summary tables are not corrected for catalyst density. The data in the figures are corrected to a catalyst density of 0.72 g./cc. Here, a correction factor of 1.8 D+L units is made for a density difference of 0.1 g./cc.

The physical properties of the catalyst were also determined. The surface area, pore volume and pore diameter were determined by the well-known Brunauer, Emmett, Teller (BET) nitrogen adsorption method.

Kaolin or halloysite clay can be used as the starting material. Preferably these materials should not contain more than 0.5% $Fe_2O_3$. Low iron is preferred since it cannot be removed economically during catalyst preparation and clay cracking catalysts high in iron are non-selective and produce too much coke and gas. Kaolin is preferred because it is plentiful and cheap. A commercial ground air-floated kaolin was used in some of the development of our clay-soda ash process. The crude product is preferred.

A commercial grade of soda ash, $Na_2CO_3 \cdot H_2O$, was used in developing our method. From a handling standpoint, the hydrated form is preferred because it does not pick up appreciable amounts of water from the air. Some difference was noted in catalytic properties when soda ash with different states of hydration was used. The major part of this difference was attributed to better mixing with the decahydrate.

The sodium compound used in the first step of the process must be a compound that decomposes on heating to release the sodium ions for reaction with the clay. Sodium chloride, sodium sulfate, and sodium hydroxide were substituted for soda ash. The catalysts made with sodium chloride and sodium sulfate were inactive. Here, soda was fixed in the structure, but did not release highly hydrated silica during subsequent acid treatment. The catalyst made with sodium hydroxide had a fair steam stability. However, it contained about twice the amount of sodium oxide present in the catalysts made with soda ash.

Sodium sulfite ($Na_2SO_3$) or sodium acid sulfite ($NaHSO_3$) react in the same manner as soda ash, however, because of the difficulty in handling sulfur dioxide ($SO_2$) fumes commercially these compounds are not considered as desirable as the carbonates. The invention is set out in the following specific but non-limiting examples.

EXAMPLE I

The effect of using various types of clays was determined in a series of runs in which clays from different sources were used to prepare a cracking catalyst and the properties of the catalyst were evaluated. In each of these runs 322 grams (dry basis) of clay and 212 grams of sodium carbonate ($Na_2CO_3 \cdot H_2O$) were mixed dry for one hour in an intensifier blender. The mixture was mulled to an extrudable paste with water and calcined for two hours at 1350° C. The dry material was ground to give a product that would pass through a 60 mesh screen and treated with 237 grams of 95% $H_2SO_4$ with 4263 grams of water to give 5% sulfuric acid. This amount of sulfuric acid diluted (by weight) is equivalent to 70% of the weight of the dry clay. After the acid treatment, the mixture was then gelled by adding concentrated ammonium hydroxide to bring the pH up to 8.5. Solids were removed by filtration and the filter cake was charged to the drier. Next the filter cake was dried for 16 hours at 160° F. and ground to a fineness that would allow the material to pass through a 20 mesh screen. The dry powder was base exchanged with a solution of 3% ammonium sulfate containing 1% ammonium hydroxide and washed three additional times with 600 ml. of deionized water. The material was redried at 230° F. and pilled into 3/16 by 3/16 inch pills and heated in air 4 hours at 1250° F. to remove the pilling aid (hydrogenated vegetable oil) and to fix the structure. The results of these runs are shown in Table I below. The various clays were all kaolin clays with the exception of halloysite clay. The difference in the kaolin clays was merely one of size or minor variations in content of iron or other impurities.

Table I

| Clay | Halloysite | Regular Kaolin | Air Floated Kaolin | Georgia Kaolin |
|---|---|---|---|---|
| D+L Activity: | | | | |
| 1,050° F. Steam | 34.9 | 32.3 | 34.4 | 32.2 |
| GPF | 1.2 | 1.3 | 1.4 | 1.3 |
| CPF | 1.3 | 1.4 | 1.0 | 1.4 |
| Density, g./cc. | 0.75 | 0.68 | 0.62 | 0.71 |
| Prop. @ 1,250° F.: | | | | |
| Surface Area, m.²/g | 127 | 165 | 176 | 169 |
| Pore Volume, cc./g | 0.22 | 0.38 | 0.54 | 0.46 |
| Chemical Analysis, percent wt.: | | | | |
| $Al_2O_3$ | 44.0 | 42.3 | 43.1 | 41.8 |
| $Na_2O$ | 1.4 | 1.1 | 1.4 | 0.8 |
| $SO_4$ | 0.3 | 2.0 | 0.1 | 0.3 |
| $TiO_2$ | 0.002 | 0.3 | 1.8 | 2.5 |
| $Fe_2O_3$ | 0.1 | 0.6 | 0.4 | 0.5 |

EXAMPLE II

The effect of soda ash on the properties of the final catalyst was demonstrated in a series of runs in which the soda ash was varied from 0 to 0.66 pound per pound of dry clay.

The procedure followed in preparing this catalyst was the same as the procedure set out in Example I. The kaolin used was an air-floated kaolin. This kaolin was mixed with soda ash using the technique described in Example I, mulled to an extrudable paste, calcined for 4 hours at 1250° F., and gelled with sulfuric acid in an amount sufficient to give an acid concentration of 0.7 pound of acid per pound of dry clay. The pH was adjusted to 8.5 with ammonia. The solids were reslurried in 1% ammonium hydroxide solution and filtered. The product was dried and ground to a fineness that would pass through a 20 mesh screen, base exchanged with a 3% ammonium sulfate-1% ammonium hydroxide solution followed by washing with deionized water as set forth above. This washed product was then redried, pilled and calcined for 4 hours at 1250° F. The data collected in this series of runs is shown in the table below and graphically in FIGURE 1.

Table II

| Soda ash; lbs. per lb. of dry clay | 0 | 0.16 | 0.42 | 0.53 | 0.66 |
|---|---|---|---|---|---|
| D+L Activity: | | | | | |
| 1,050° F. Steam | 7.0 | 22.0 | 28.0 | 34.7 | 34.9 |
| GPF | 2.8 | 1.8 | 1.6 | 1.4 | 1.0 |
| CPF | 2.5 | 1.8 | 1.3 | 1.2 | 0.9 |
| Density, g./cc. | 0.65 | 0.68 | 0.69 | 0.72 | 0.73 |
| Prop. @ 1,250° F.: | | | | | |
| Surface Area, m.²/g | 52 | 129 | 156 | 160 | 207 |
| Pore Volume, cc./g | 0.12 | 0.23 | 0.30 | 0.37 | 0.31 |
| Chemical Analysis, percent wt.: | | | | | |
| $Al_2O_3$ | 43.4 | 45.0 | 44.0 | 42.6 | 43.7 |
| $Na_2O$ | 0.02 | 0.1 | 0.6 | 1.33 | 1.0 |
| $SO_4$ | 5.4 | 3.2 | 1.0 | 0.05 | 0.11 |
| $Fe_2O_3$ | 0.27 | 0.29 | 0.30 | 0.40 | 0.27 |

EXAMPLE III

The effect of calcination conditions of the clay-soda ash mix on the properties of the final catalyst was determined in a series of runs in which an air-floated clay was treated with sodium carbonate in the ratio of 0.53 pound of soda per pound of clay.

Figure 2:
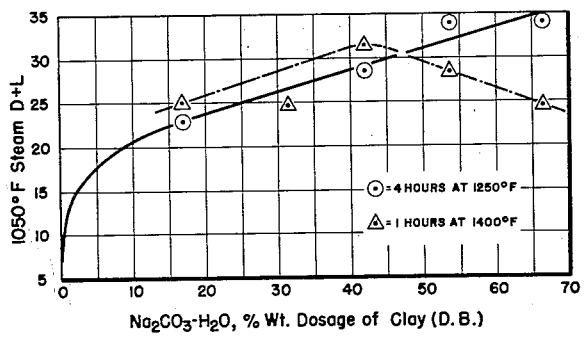

In these runs the procedures used were essentially the same as the procedure set out in Example I. The clay was treated with soda ash, mulled to an extrudable paste and calcined for various periods of time at different temperatures. After calcination the clay-soda-ash mix was ground to a fineness that would pass through a 60 mesh screen, gelled with sufficient sulfuric acid to give an acid to dry clay ratio of 0.7 pound per pound of clay and treated with ammonium hydroxide to increase the pH to 8.5. The product was filtered, reslurried as before, dried at 180° F., base exchanged with a 3% ammonium sulfate 1% ammonium hydroxide solution followed by washes with deionized water. After the material was washed, it was redried, pilled and calcined for 4 hours at 1250° F. The data collected is presented in Table III and is shown graphically in FIGURE 2.

Table III

| | Calcination Time and Temperature (° F.) | | | | |
|---|---|---|---|---|---|
| | 1 hr. at 1,250 | 2 hrs. at 1,250 | 4 hrs. at 1,250 | 1 hr. at 1,350 | 2 hrs. at 1,350 |
| D+L Activity: | | | | | |
| 1,050° F. Steam | 27.5 | 28.6 | 34.7 | 32.8 | 34.4 |
| GPF | 1.2 | 1.6 | 1.4 | 1.5 | 1.4 |
| CPF | 1.1 | 1.2 | 1.2 | 1.3 | 1.0 |
| Density, g./cc. | 0.73 | 0.69 | 0.72 | 0.77 | 0.62 |
| Prop. @ 1,250° F.: | | | | | |
| Surface Area, m.²/g | 149 | 169 | 160 | 141 | 176 |
| Pore Volume, cc./g | 0.28 | 0.32 | 0.37 | 0.30 | 0.54 |
| Chemical Analysis, percent wt.: | | | | | |
| $Al_2O_3$ | 43.1 | 43.0 | 42.6 | 42.5 | 43.1 |
| $Na_2O$ | 0.48 | 1.1 | 1.3 | 1.2 | 1.4 |
| $SO_4$ | 0.07 | 0.07 | 0.05 | 0.06 | 0.1 |
| $TiO_2$ | 2.34 | 2.15 | 2.07 | 2.26 | 2.19 |
| $Fe_2O_3$ | 0.37 | 0.40 | 0.40 | 0.40 | 0.40 |

EXAMPLE IV

The effect of calcination conditions of the clay-soda-ash mix on the properties of the catalyst where the amount of sodium carbonate used was increased, was determined in a series of runs in which an air-floated clay was treated with 66 grams of sodium carbonate per hundred grams of clay. This material was then mulled to an extrudable paste by using the technique described in the previous examples, calcined at various periods of time at different temperatures, ground through a 60 mesh screen, gelled with sulfuric acid equivalent to 70 grams of $H_2SO_4$ per hundred grams of clay treated with ammonia to bring the pH to 8.5 and filtered. The filtrate was reslurried with 1% solution of ammonium hydroxide, refiltered, dried, and ground to a fineness that would pass through a 60 mesh screen. The material was then treated with a 3% ammonium sulfate-1% ammonium hydroxide solution and washed with deionized water as described in Example I. The solids were then dried at 230° F. and pilled into 3/16 by 3/16 inch pills. The pilled catalyst was calcined for three hours at 1250° F. The properties of the catalyst prepared according to this process are given in Table IV below.

Table IV

|  | Calcination Time and Temperature (° F.) | | |
| --- | --- | --- | --- |
|  | 4 Hrs. at 1,250 | 4 Hrs. at 1,350 | 1 Hr. at 1,400 |
| D+L Activity: | | | |
| 1,050° F. Steam | 34.9 | 23.9 | 26.1 |
| GPF | 1.0 | 1.8 | 1.8 |
| CPF | 0.9 | 1.6 | 1.4 |
| Density, g./cc | 0.68 | 0.66 | 0.81 |
| Surface Prop. @ 1,250° F.: | | | |
| Surface Area, m.²/g | 207 | 180 | 93 |
| Pore Volume, cc./g | 0.31 | 0.25 | 0.16 |
| Chemical Analysis, percent wt.: | | | |
| $Al_2O_3$ | 43.7 | 41.6 | 44.0 |
| $Na_2O$ | 1.0 | 0.21 | 0.96 |
| $SO_4$ | 0.11 | 0.79 | .43 |
| $TiO_2$ | 2.21 | 2.12 | 1.28 |
| $Fe_2O_3$ | 0.27 | 0.29 | 0.29 |

It is apparent from an examination of these data that the most desirable calcination temperature is 4 hours at 1250° F. The highest D+L was obtained at this calcination temperature.

EXAMPLE V

In all of the work reported previously the acid was reported as the amount of acid used in terms of the weight of acid per given weight of clay. A series of runs were completed to determine the effect of differing the acid concentration used to produce the ratio of 70 grams of 100% sulfuric acid per hundred grams of clay. In these runs the acid was varied between 5 and 15 weight percent concentration and the quantity necessary to supply the equivalent of 70 grams of acid per 100 grams of dry clay was added in each case. This effect was evaluated in two separate sets of conditions. In one case the dry clay was treated with 53 grams of soda ash per 100 grams of clay, and in another case 66 grams of soda ash per 100 grams of clay. The results of the data collected in these runs is shown in Table V below:

Table V

| Soda Ash g/100 of clay | 53 | | | 66 | |
| --- | --- | --- | --- | --- | --- |
| Calcination | 1 Hr. at 1,400° F. | | | 4 Hrs. at 1,250° F. | |
| Acid Concentration in wt. Percent | 15 | 10 | 5 | 5 | 15 |
| Steam D+L at 1,050° F | 27 | 28 | 35 | 35 | 34 |
| GPF | 1.7 | 1.8 | 1.4 | 1.3 | 1.1 |
| CPF | 1.8 | 1.4 | 1.2 | 1.2 | 1.2 |
| Density g./cc | 0.77 | 0.79 | 0.74 | 0.72 | 0.79 |
| Properties at 1,250° F.: | | | | | |
| Surface Area m.²/g | 146 | 124 | 159 | 165 | 162 |
| Pore Volume cc./g | 0.20 | 0.19 | 0.37 | 0.22 | 0.22 |

Where the soda ash concentration was 66 grams of soda ash per 100 grams of clay, the use of either 5% or 15% by weight of acid to give the 70 grams per 100 grams of clay gave essentially the same results where the material was calcined for 4 hours at 1250° F. However, when 53 grams of soda ash was added per 100 grams of clay the best catalyst was prepared using 5 wt. percent acid to give the desired concentration of sulfuric acid in the final catalyst. In each of these cases the preparation procedure was the same as that outlined by Example IV above.

EXAMPLE VI

Figure 3:
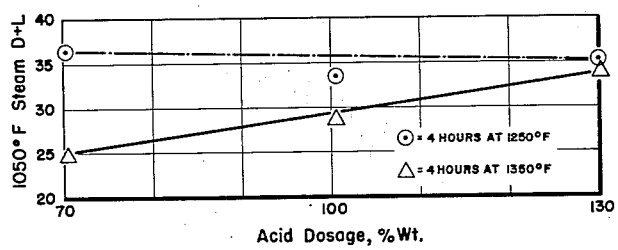

The effect of varying the acid dosage (the amount of acid used) to treat the clay from 70 grams of acid per 100 grams of clay to 130 grams of acid per 100 grams of clay was determined in a series of runs using the procedure described in Examples I through IV above. In this series of runs the sodium carbonate concentration was kept constant at a ratio of 66 grams of soda ash per 100 grams of clay. The catalyst was calcined for 4 hours at 1350° F. and 4 hours at 1250° F. The effect of changing the acid concentration from 70 grams of acid to 100 grams of clay to 130 grams of acid to 100 grams of clay is shown in Table VI below, and graphically in FIGURE 3.

Table VI

|  | Calcination Time and Temperature | | | | | |
| --- | --- | --- | --- | --- | --- | --- |
|  | 4 Hrs. at 1,350° F. | | | 4 Hrs. at 1,250° F. | | |
|  | Acid used to treat clay-soda ash mix in g./100 g. of clay | | | | | |
|  | 70 | 100 | 130 | 70 | 100 | 130 |
| D+L Activity: | | | | | | |
| 1,050° F. Steam | 23.9 | 28.1 | 33.7 | 34.9 | 32.5 | 33.1 |
| GPF | 1.8 | 1.3 | 1.3 | 1.0 | 1.2 | 1.3 |
| CPF | 1.6 | 1.7 | 1.3 | 0.9 | 1.4 | 1.3 |
| Density, g./cc | 0.66 | 0.73 | 0.74 | 0.73 | 0.72 | 0.63 |
| Prop. @ 1,250° F.: | | | | | | |
| Surface Area, m.²/g | 180 | 188 | 250 | 207 | 249 | 314 |
| Pore Volume, cc./g | 0.25 | 0.31 | 0.31 | 0.31 | 0.34 | 0.48 |
| Chemical Analysis, Percent wt.: | | | | | | |
| $Al_2O_3$ | 41.6 |  | 44.1 | 43.7 | 44.2 | 44.5 |
| $Na_2O$ | 0.21 | 0.49 | 0.51 | 1.0 | 0.69 | 0.37 |
| $SO_4$ | 0.79 |  | 0.37 | 0.11 | 0.23 | 0.14 |
| $Fe_2O_3$ | 0.29 |  | 0.34 | 0.27 | 0.30 | 0.35 |

It is obvious from a review of the data on the product calcined at 1350° F. that increasing the acid from 70 grams per 100 grams of clay to 130 grams per 100 grams of clay improved the D+L activity 4 units for the first 30% increase and additional 5 units for the second 30% increase. There was no appreciable improvement in the product calcined at 1250° F.

EXAMPLE VII

One large (10 pound) spray-dried preparation was made to check on the preparation technique developed by means of the one pound batches. The preparation also provided enough catalyst to complete the evaluation of the catalyst in a fluidized fixed bed unit. A method used in preparing this catalyst was essentially the same as the methods described in the examples above except that the material was spray dried. The data collected in this run and a comparison of the material prepared with a commercial clay catalyst is shown in Table VII below:

Table VII

| Catalyst | Commercial Clay Catalyst | Spray Dried Product |
| --- | --- | --- |
| D+L Activity: | | |
| 1,250° F. Thermal | 35 | 41 |
| 1,550° F. Thermal | 36 | 38 |
| 1,650° F. Thermal | 28 | 30 |
| 1,050° F. Steam | 29 | 33 |

It is apparent from review of this data that the catalyst prepared using the process described above gave a material that was superior to the commercial clay catalyst.

EXAMPLE VIII

A clay catalyst was prepared using our technique and the product was compared with a commercial 25% alumina synthetic catalyst. The catalyst was prepared using an air-floated clay. The clay was treated with sodium carbonate at the rate of 66 grams of sodium carbonate per 100 grams of dry clay, mulled to an extrudable paste with water, and calcined for 4 hours at 1250° F. The dry material was then ground to pass through a 60 mesh screen and gelled with sulfuric acid using 15% acid. The equivalent of 130 grams of acid per 100 grams of clay was added. After the material was acidified, it was treated with ammonia to a pH of 8.5 and filtered. The filter cake was reslurried with a 1% solution of ammonium hydroxide and spray dried. The product was treated with solution of 3% ammonium sulfate-1% ammonium hydroxide and washed with deionized water using the technique described in Example I. The product was dried, formed into pills 3/16 by 3/16 inch in diameter, and calcined for 4 hours at 1250° F. The comparison of this material with the 25% synthetic material is shown in Table VIII below:

*Table VIII*

| Catalyst | 25% Synthetic | Product of Run 1 |
|---|---|---|
| D+L Activity: | | |
| 1,250° F. Thermal | 56 | 50 |
| 1,550° F. Thermal | 53 | 46 |
| 1,650° F. Thermal | 45 | 44 |
| 1,750° F. Thermal | 27 | 34 |
| 1,050° F. Steam | 36 | 33 |
| Chemical Analysis in wt. percent: | | |
| $Al_2O_3$ | 25.6 | 42.1 |
| $Fe_2O_3$ | 0.02 | 0.40 |
| $SO_4$ | 0.2 | 0.5 |
| $Na_2O$ | 0.03 | 0.8 |

It is apparent from an examination of this data that material prepared using the technique set out above compares very favorably with the 25% synthetic catalyst. Using our technique we have the very unexpected result that the thermal and steam stabilities are still well within the range of an effective catalyst even though the sodium oxide content of this catalyst is 0.8. In the catalyst prepared in other runs $Na_2A$ is present in a concentration of from .5% to 1.0% or in the order of 10 times the concentration previously considered maximum. This is very surprising in that the general feeling in the catalyst field is that a high sodium content in any catalyst is per se bad. The general effect of a high sodium content in the conventional catalyst is to give a low thermal and steam stability.

EXAMPLE IX

The effect of the size of the calcined clay-soda-ash mix prior to acid gelation was evaluated in a series of runs in which the air-floated clay was treated with 53 grams of sodium carbonate per gram of dried clay. The clay-soda-ash mixture was calcined for 1 hour at 1400° F. The process was essentially the same as the process described in Example IV above. The size of the material was varied from 20 to 200 mesh. The data collected in this series of runs is shown in Table IX below:

*Table IX*

| | Size after grinding to pass through screen of mesh sizes | | | |
|---|---|---|---|---|
| | 20 | 60 | 100 | 200 |
| D+L Activity: | | | | |
| 1,050° F. Steam | 33.6 | 35.4 | 34.1 | 35.6 |
| GPF | 1.2 | 1.4 | 1.4 | 1.4 |
| CPF | 1.2 | 1.2 | 1.4 | 1.3 |
| Density, g./cc | 0.68 | 0.74 | 0.72 | 0.72 |
| Prop. @ 1,250° F.: | | | | |
| Surface Area, m.²/g | 172 | 159 | 159 | 162 |
| Pore Volume, cc./g | 0.40 | 0.37 | 0.30 | 0.29 |
| Chemical Analysis, percent wt.: | | | | |
| $Al_2O_3$ | 42.7 | 42.2 | 42.7 | 42.7 |
| $Na_2O$ | 1.55 | 1.33 | 1.28 | 1.22 |
| $SO_4$ | 0.34 | 0.44 | 0.20 | 0.21 |
| $TiO_2$ | 2.06 | 2.53 | 1.96 | 2.05 |
| $Fe_2O_3$ | 0.33 | 0.35 | 0.35 | 0.39 |

A review of the data presented in Table IX indicates clearly that there is no difference in D+L activity over the range of materials that would pass through a screen from 20 to 200 mesh. In practice materials that pass through a 60–100 mesh screen are preferred. It is interesting to note that the material passed through a 20 mesh screen had more sodium oxide than the other materials.

Obviously many modifications and variations of the invention as herein above set forth may be made without departing from the essence and scope thereof and only such limits should be applied as are indicated in the appended claims.

What is claimed is:

1. A process for preparing cracking catalyts from clay which comprises:
   (a) calcining a clay selected from the group consisting of kaolin and halloysite at a temperature of 800 to 1400° F. for a period of 1 to 4 hours with from 35 to 80% by weight of the dry clay of a sodium compound selected from the group consisting of sodium carbonate, sodium sulfite, sodium acid sulfite and sodium hydroxide sufficient to form a sodium-alumina silicate complex,
   (b) adding 45 to 130 weight percent of 3 to 15 weight percent concentration of a strong mineral acid to the complex to destroy same and simultaneously to gel the silicate and dissolve the alumina,
   (c) precipitating the solubilized alumina with ammonia
   (d) filtering the resulting mass,
   (e) drying said mass,
   (f) removing sodium from said mass by base exhange with 3 weight percent solution of ammonium sulfate containing 1% by weight of ammonium hydroxide, and
   (g) subsequently washing, drying, redrying, and recovering the catalyst product.
2. The process of claim 1 wherein the clay is treated with from 40 to 50% by weight of the dry clay of sodium carbonate to form the complex.
3. The process of claim 2 wherein the strong mineral acid is sulfuric acid and the quantity added is in the range of 70 to 100 weight percent of 5 weight percent concentration.
4. The process of claim 3 wherein the soluble alumina is precipitated by the addition of a quantity of ammonium hydroxide sufficient to increase the slurry pH to about 5.0 to 10.
5. The process of claim 1 wherein the complex is calcined for 1 hour at 1400° F.
6. The process of claim 1 wherein the clay is treated with 40 to 50 weight percent of the dry clay of sodium carbonate monohydrate.

References Cited in the file of this patent

UNITED STATES PATENTS

| 1,916,902 | Wilbur | July 4, 1933 |
| 2,489,309 | Mills | Nov. 29, 1949 |
| 2,727,868 | Simpson et al. | Dec. 20, 1955 |